(12) United States Patent
Franzius et al.

(10) Patent No.: US 11,580,364 B2
(45) Date of Patent: Feb. 14, 2023

(54) UNSUPERVISED LEARNING OF METRIC REPRESENTATIONS FROM SLOW FEATURES

(71) Applicant: HONDA RESEARCH INSTITUTE EUROPE GMBH, Offenbach/Main (DE)

(72) Inventors: Mathias Franzius, Offenbach (DE); Benjamin Metka, Offenbach (DE); Ute Bauer-Wersing, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 992 days.

(21) Appl. No.: 16/288,489

(22) Filed: Feb. 28, 2019

(65) Prior Publication Data
US 2019/0272462 A1  Sep. 5, 2019

(30) Foreign Application Priority Data
Feb. 28, 2018 (EP) .................................. 18159286
Jun. 29, 2018 (EP) .................................. 18180852

(51) Int. Cl.
| G06N 3/04 | (2006.01) |
| G06F 17/18 | (2006.01) |
| G06N 3/088 | (2023.01) |
| H04W 4/02 | (2018.01) |
| G05D 1/02 | (2020.01) |

(52) U.S. Cl.
CPC ......... *G06N 3/0472* (2013.01); *G05D 1/0274* (2013.01); *G06F 17/18* (2013.01); *G06N 3/088* (2013.01); *H04W 4/026* (2013.01); *H04W 4/027* (2013.01); *G05D 1/0272* (2013.01)

(58) Field of Classification Search
CPC .... G06N 3/0472; G06N 3/088; G05D 1/0274; G05D 1/0272; G06F 17/18; H04W 4/026; H04W 4/027
See application file for complete search history.

(56) References Cited

U.S. PATENT DOCUMENTS

| 8,913,821 B1 * | 12/2014 | Agarwal | G06T 7/73 |
| | | | 382/294 |
| 9,427,874 B1 * | 8/2016 | Rublee | B25J 11/0075 |

(Continued)

*Primary Examiner* — Luat Phung
(74) *Attorney, Agent, or Firm* — Squire Patton Boggs (US) LLP

(57) ABSTRACT

A method of unsupervised learning of a metric representation and a corresponding system for a mobile device determines a metric position information for a mobile device from an environmental representation. The mobile device comprises at least one sensor for acquiring sensor data and an odometer system configured to acquire displacement data of the mobile device. An environmental representation is generated based on the acquired sensor data by applying an unsupervised learning algorithm. The mobile device moves along a trajectory and the displacement data and the sensor data are acquired while the mobile device is moving along the trajectory. A set of mapping parameters is calculated based on the environmental representation and the displacement data. A metric position estimation is determined based on a further environmental representation and the calculated set of mapping parameters.

23 Claims, 4 Drawing Sheets

(56) References Cited

U.S. PATENT DOCUMENTS

| | | | |
|---|---|---|---|
| 10,937,186 B2* | 3/2021 | Wang | G05D 1/0289 |
| 2014/0005933 A1* | 1/2014 | Fong | G01C 21/32 |
| | | | 701/447 |
| 2016/0271795 A1* | 9/2016 | Vicenti | G05D 1/0274 |
| 2019/0033867 A1* | 1/2019 | Sharma | G08G 1/0133 |

* cited by examiner

UNSUPERVISED LEARNING OF METRIC REPRESENTATIONS FROM SLOW FEATURES

BACKGROUND

Field

The invention relates to the field of self-localization of mobile systems and in particular for autonomous mobile systems such as robots, using unsupervised learning such as slow feature analysis for generating environmental representations. The invention proposes a method for unsupervised learning of a metric representation and a corresponding system for a mobile device.

DESCRIPTION OF THE RELATED ART

Localization is a key issue for mobile autonomous devices (mobile robots), as many functions such as moving to a target location starting from a current location require the current location in position data.

Visual Self-Localization is an emerging field of research. A camera sensor on a mobile robot yields rich and versatile sensor data that can be used for localization purposes. Major classes of localization approaches are for example Self Localization and Mapping (SLAM) algorithms and algorithms based on slowness learning such as Slow Feature Analysis (SFA).

Most self-localization algorithms belong to the field of SLAM algorithms which are typically based on identifying and tracking of point features in a metric space. SLAM algorithms are often inherently metric and use information acquired by an odometer already during a mapping process and thus do not require a projection into metric space of their results.

An odometer is an instrument measuring a distance traveled by a mobile device. An odometer provides displacement data of a mobile device, for example by counting wheel rotations.

Topological SLAM algorithms as a specific class of SLAM algorithms classify positions into a finite set of places and build a graph of connected positions without metric relations and thus do not require metric positions.

While the cited approaches are feasible for research purposes, their use is ill suited for a small commercial robots like a lawn mowing robot with only limited computing resources.

Another class of localization algorithms performs location fingerprinting. Location fingerprinting classifies a position as one of a discrete set of known locations, for example a set of rooms in an indoor environment. The locations need not be connected as in a topological map and interpolation between the locations may not be possible.

In contrast to the SLAM approaches mentioned above, environment representations generated based on slowness learning algorithms, sometimes referred to as temporal stability learning, are not metric and thus have no direct way to include metric odometer data. However, a multitude of potentially uncalibrated additional sensors providing sensor data can be used to generate environmental representations with a relatively simple setup and low computational effort. Other approaches from location fingerprinting can be reused, yielding a dense, ordered and interpolated estimate of position instead of a discrete set of unconnected position estimates.

Earlier approaches based on slowness learning use external sensors for generating ground truth metric position measurements. These ground truth measurements can then be used to train regressors for a metric 2-dimensional (2D) position of the mobile device. These regressors can be stored and used later in order to estimate the position of the mobile device based on new data without any external sensors. Additionally, displacement data of an odometer of the autonomous device can be fused with the regressor outputs, for example using a Kalman filter, to provide localization of the mobile device with higher accuracy. The use of external sensors, however, is costly, cumbersome and often problematic because of synchronization issues between the autonomous device and external sensors.

Thus, the problem of improving self-localization of a mobile device is to be addressed.

SUMMARY

The problem is solved by the claimed methods.

The dependent claims define further advantageous embodiments of the invention.

A method for determining a metric position information for a mobile device from an environmental representation according to a first aspect includes the mobile device comprising at least one sensor and acquiring sensor data via the at least one sensor. An odometer system is configured to acquire displacement data of the mobile device. The method comprises a step of generating an environmental representation R based on the acquired sensor data by applying an unsupervised learning algorithm. The inventive method comprises a step of the mobile device moving along a trajectory T and a step of calculating a set of mapping parameters W based on the environmental representation R and displacement data. The displacement data and the sensor data are acquired while the mobile device is moving along the trajectory. In a step of determining the metric position estimation, the metric position information is determined based on a further environmental representation and the calculated set of mapping parameters W.

The method proposes an autonomous approach to learn mapping parameters, for example position regressors, without requiring external sensors, thus saving cost and increasing robustness against synchronization issues of the self-localization approach. While the known approaches proved feasible for research purposes, the method is well suited for mobile devices such as small commercial robots like an autonomous lawn mower.

Thus, this invention offers increased position accuracy estimates by using data fusion of odometer data with an environmental representation obtained based on onboard sensor data. In order to achieve this, the inventive approach uses the learned mapping parameters from a training phase which enable to provide a metric position estimation from a further environmental representation acquired during an operation phase. This approach is for example advantageously used in a commercial lawn mower setup and dispenses with the need for external sensors for learning ground truth metric localization data. With the claimed approach, linear movement patterns of typical commercial lawn mowers are used to learn the mapping parameters along line straight segments as a constraint that makes the extraction of metric positions feasible.

Sensor data may be acquired by sensors such as cameras that are mounted on the device, especially omnidirectional cameras, and the acquired sensor data is used for learning the environmental representation. In order to avoid accumulating errors from the odometer system, the sensor data measures data from the environment of the mobile device and thus the method not only relies on integrating the device's movements as the odometer system does.

Sensors other than cameras can be one or any combination of electromagnetic area wire sensors, global navigation satellite systems (GNSS), depth measurement sensors, including laser scanners, time-of-flight cameras, stereo-cameras or acoustic sensors.

The method combines odometry with its locally excellent results, which nevertheless degrade with time, and a learned environmental representation, which finds a consistent spatial representation globally, but is inherently non-metric and locally jittered. A combination of both after applying the method, for example by Kalman filtering, may even yield higher localization accuracy. The inventive method generates the prerequisite for such combination by generating a metric position information.

The method for determining a metric position information according to an embodiment is characterized in that the trajectory T comprises plural curve segments $S_i$ which are parameterized by equations of low dimensionality in the step of calculating a set of mapping parameters.

Thus, an advantageously simple mathematical description of the plurality of curve segments $S_i$ constituting the trajectory T during the training phase enables to use known calculation algorithms for solving optimization problems such as linear or affine regression to determine the mapping parameters. The method is therefore suitable for small autonomous mobile devices such as a lawn mower due to its efficient use of computation resources.

Curve segments S used for calculating the mapping parameters W preferably cover most of the trained working area of the mobile device, especially the outer regions of the working area near its borders. Interpolation of position information for new positions during an operation phase inside the working area actually covered by the trajectory T is usually much more accurate than extrapolation to new positions outside these regions covered by the trajectory T.

Preferably, curve segments $S_i$ of the trajectory T used for determining the mapping parameters W should sufficiently often intersect each other. Purely collinear curves enable metric position learning along one axis of the two-dimensional working area.

Generally, a trade-off between a number and a length of curve segments $S_i$ as well as spatial distribution of the curve segments $S_i$ of the trajectory T on the one hand, and training efficiency on the other hand will exist.

The method for determining a metric position information according to a preferred embodiment includes the plural curve segments of curve types that include at least one curve type of a straight line, a nearly straight line, a circle, a circle segment, a sigmoidal curve, a sine curve, a spline or a polynomial curve of a low order.

The predefined paths of an autonomous mobile device moving in its assigned working area (working environment) already use predefined curve types as cited. These curve types offer the capability to cover an entire working area with a trajectory T which can simultaneously be parametrized efficiently for calculating the mapping parameters W.

Curve segments $S_i$ of the line type represent the lowest-dimensional curve type during the training phase. Line segments are thus the simplest approach, which is also compatible with the typical trajectories of autonomous lawn mowers and cleaning robots. Furthermore, line segments, especially when driven at constant speed, minimize acceleration of the mobile device and accordingly reduce displacement errors in the displacement data (odometry errors) due to wheel slip. Nevertheless, other curve types are possible as well, preferably if they can be parametrized with few parameters, for example polynomials, splines, circles and circle segments, or sigmoidal curves. Such larger number of types (classes) of curves imposes lower requirements on the movement path constituting the trajectory T of the mobile device during a dedicated training phase. Alternatively or additionally an early operation phase of the mobile device as a non-dedicated training phase may be used, in particular when different curve types are available.

A method for determining a metric position information according to a preferred embodiment comprises a step of segmenting the trajectory T into the curve segments with a set of curve parameters each. The set of curve parameters provides a mathematical description of the corresponding curve segment. In the step of calculating the set of mapping parameters, the set of mapping parameters W and the set of curve parameters is calculated by minimizing on all of the curve segments $S_i$ a difference measure between the displacement data on the one hand and a corresponding change in the environmental representation R on the other hand, wherein simultaneously a mapped environmental representation after applying the calculated set of mapping parameters W on the environmental representation R lies on a corresponding matching curve segment $S_i$.

Thus, the method offers the possibility to integrate the advantages of slow feature analysis or comparable slowness algorithms with the displacement data from the odometer system to generate a metric position estimate combining the advantages of the different approaches to solving the localization problem.

The method for determining a metric position information according to an embodiment has the odometer system acquiring the displacement data from at least one of a wheel odometer, a visual odometer and an inertial measurement unit.

The method therefore uses at least one widely used odometer system already found in current autonomous mobile devices to generate a metric position information and accordingly requires no additional hardware components and is therefore economically to implement even in low-cost mobile devices.

The method for determining a metric position information according to a preferred embodiment uses as the unsupervised learning algorithm a slowness learning algorithm, in particular a SFA. The method is capable of significantly improving the SFA by integrating metric position information into its generated environmental representation. Therefore, the method offers the capability to easily implement further post-processing steps for an improved localization and navigation function of the mobile device, as the environmental representation now provides metric position information also. Furthermore, an accuracy of the localization of the mobile device is enhanced by combining both localization method with its respective benefits.

The method may use SFA as one efficient implementation of the slowness objective function, which, in the given setting, results in spatially smooth environmental representations. The smoothness allows to use linear or low-complexity nonlinear mappings and additionally the SFA yields a compact low-dimensional environmental representation, which makes the mapping with the set of mapping parameters W more efficient due to requiring fewer training points. Rotation has a very high influence on the efficiency of an environmental representation. SFA can be learned in a way such that an orientation of the mobile device does not influence the environmental representation, thus the environmental representation shows orientation invariance.

Alternatively, online versions of slowness learning can be used, which may require less memory and computational power.

In contrast, a spatial representation based on raw pixel values, for example, would require computing a regression with an extremely high number of parameters. However, other sensory representations than those based on SFA are possible. One example could be to use the outputs of a penultimate layer of a deep convolutional neural network (CNN) trained for position recognition and perform position regression on this data. Known approaches employ camera pose regression, in which the full 6D pose (x/y/z position and 3 axes of rotation) of a camera is learned by a supervised regression. If the sensor movements during training are locally line segments the method may allow to do achieve camera pose regression in 6D in an unsupervised manner.

In order to circumvent the problems with orientation dependent representations, sensor data can be processed to become orientation invariant, for example based on data from a magnetic field (compass) sensor and rotating an omnidirectional image's orientation to always face a fixed direction.

Alternatively, some representations are inherently orientation invariant, e.g. Fourier representations on an omnidirectional image with discarded phase information. After such a step, simpler environmental representations than SFA may be sufficient for the metric position estimation.

The method for determining a metric position information according to an advantageous embodiment performs the step of calculating mapping parameters during a training phase and/or during an initial operating phase and/or at scheduled intervals and/or continuously and incrementally.

The claimed method is accordingly easily integrated with the current phases of using a mobile device, for example during a training phase when the mobile device learns an environmental representation of its working environment or at the start of the operation phase when the mobile device begins to perform its assigned task in the working environment. On the other hand, the method is equally suitable to be performed during the operation phase, for example at regular intervals in order to cope with varying environments.

Preferably, the method for determining a metric position information repeats the step of calculating the set of mapping parameters when an inconsistency between the metric position information and the displacement data is detected.

A gradual degradation of the calculated position estimation during an operation phase is avoided, when discrepancies between the metric position information and the displacement data are monitored and in case of a detecting an inconsistency, the learning of the set of mapping parameters W is repeated in order to take account of possible changes in the working environment.

The method for determining a metric position information according to an embodiment repeats the step of calculating mapping parameters when a residual exceeds a threshold in the step of calculating the set of mapping parameters W.

Thus, the method enables to gradually improve the results for the position estimation in order to provide a sufficient precision.

Advantageously the set of mapping parameters W are calculated as affine regressions for the location of the mobile device, in particular as two affine regressions for a two-dimensional location of the mobile device on a planar surface.

The method for determining a metric position information according to an embodiment calculates the set of mapping parameters W as nonlinear regressions, for example quadratic regressions, or by fitting with a neural network.

For determining affine or non-linear regressions, well established and computationally efficient algorithms exist which enable to implement the method even on less capable mobile devices in terms of processing capabilities. Neural networks offer equally advantageous characteristics for implementing the method based on unsupervised learning.

A preferred embodiment uses linear (or affine) regression and quadratic regression as mapping functions. Quadratic regression refers to linear regression on an input signal that has been expanded into the space of all monomials of degree 2, for example $[x_1, x_2, \ldots, x_n, x_1^2, x_1x_2, \ldots, x_n^2]$). The affine variant of regression cares for correcting a constant offset in the metric coordinates. Alternatives are robust regression to better cope with potential outliers, and/or other nonlinear expansions. Neural networks are a further example of such nonlinear regression approaches.

The method for determining a metric position information according to an embodiment calculates the set of mapping parameters W by solving an optimization problem using a set of linear equations, or by using a simplex algorithm, or by a gradient descent on the set of equations E.

According to an embodiment, the method for determining a metric position information calculates the mapping parameters by the gradient descent on the set of equations E, wherein derivatives of the set of equations E are computed before and stored in memory.

The processing of calculating the mapping parameters is accordingly computationally efficient implemented, when referring to the previously calculated and stored derivatives is possible.

The method for determining a metric position information of an advantageous embodiment initializes parameters for calculating the set of mapping parameters W based on at least a part of the displacement data.

This is advantageous, as the displacement data provided by the odometer system has the tendency to provide precise displacement data at the beginning of a movement of the mobile device. The precision of displacement data degrades with time during the movement due to accumulating errors. Nevertheless, the displacement data offers particular precise displacement values for initializing the calculation in order to achieve a good convergence of the algorithm.

The method for determining a metric position information according to a preferred embodiment comprises a step of transforming the calculated metric position estimation to a desired coordinate system, the step of transforming in particular including at least one of a rotating, mirroring and shifting operation.

The method for determining a metric position information according to an embodiment is characterized in that the set of mapping parameters W for the desired coordinate system are centered in a base station of the mobile device. The set of mapping parameters W are calculated by constraining an optimization to a reference map position to an initial trajectory point on the trajectory T in the base station. Alternatively, the set of mapping parameters W are calculated by correcting the set of mapping parameters W in a post-processing step of at least one of rotating, shifting and mirroring the mapping performed by the set of mapping parameters W to match an initial portion of the displacement data corresponding to an initial portion of the trajectory T.

Using the base station of the mobile device, for example a charging station, as a basis for a coordinate system for the metric position estimate and an orientation of the mobile device in a parking or charging position as a base orientation of 0 degrees of the metric position information offers an advantageous basis of the position estimate.

The method for determining a metric position information according to a preferred embodiment has the step of the mobile device moving along the trajectory T as part of a learning phase for learning the environmental representation from the sensor data. A memory of the mobile device is configured to store the sensor data acquired during the learning phase. Additionally or alternatively the step of the mobile device moving along a trajectory T is performed after the learning phase of learning the environmental representation based on the sensor data has been executed. Both possibilities of performing the method are possible and enable the method to be flexibly implemented according to processing demands and storage requirements on the one hand and available processing capabilities and storage capacity of the mobile device on the other hand.

In an embodiment of the method for determining a metric position information, the step of calculating a set of mapping parameters W is performed during a learning phase for learning the environmental representation from the sensor data, wherein an online learning algorithm for learning the environmental representation R is used.

The method for determining a metric position information according to an embodiment has the step of calculating a set of mapping parameters alternately performed with a learning step of learning the environmental representation R from sensor data. Thus, metric position information, or at least metric position estimates are already available during a first portion of the learning phase M1. The metric position information is further refined during a subsequent step of calculating the set of mapping parameters W and provides position information converging over time. Thus, limited memory and computational resources are used economically.

The second aspect of the invention is a system for determining a metric position information of a mobile device from an environmental representation. The mobile device comprises at least one sensor configured to acquire sensor data and an odometer system configured to obtain displacement data of the mobile device. The system comprises an electronic control unit (processor) configured to generate an environmental representation R generated from the sensor data by applying an unsupervised learning algorithm. The system is characterized in that the electronic control unit is configured to calculate a set of mapping parameters W based on the environmental representation R and the displacement data, wherein the displacement data and the sensor data is acquired while the mobile device is traveling along a trajectory T. The system is further configured to calculate the metric position information based on a further environmental representation acquired during an operation phase and the calculated set of mapping parameters W.

The system for determining a metric position information according to an advantageous embodiment includes the mobile device, which is a mobile robot, in particular a robotic lawn mower or a robotic cleaner.

The invention also offers increased position accuracy estimates by using displacement data (odometer data) fusion with the environmental representation R based on the learned set of mapping parameters W in the autonomous mobile device. The linear movement patterns of typical lawn mower robots are used along straight line shaped curve segments as a constraint that make the extraction of metric positions feasible.

It may also apply to other areas of mobile devices where localization is beneficial and where sensory data and displacement sensors (odometry) are available, for example a robot arm or CNC device positioning, or even accurate smartphone localization in a confined area.

A computer program according to a third aspect includes program-code means for executing the steps according to one of the embodiments, when the program is executed on a computer or digital signal processor. A computer program-product according to the third aspect includes program-code means stored on a machine-readable medium for executing the steps when the program is executed on a computer or digital signal processor.

BRIEF DESCRIPTION OF THE DRAWINGS

An embodiment of the navigation method and the navigation system is discussed in detail using the figures, in which FIG. 1 denotes a flowchart of a self-localization method for a mobile device according to an embodiment, FIG. 2 denotes a general block diagram of main elements of the self-localization system of an embodiment in a mobile device, FIGS. 3(*a*)-3(*c*) show a schematic model architecture for an SFA based analysis of an environment of a mobile device.

DETAILED DESCRIPTION

The term odometry is used for methods using integration the mobile device's displacement measurements, for example from wheel turns or an IMU. The term is used for displacement sensors or odometer systems (sensors) as well as for integrated displacement measurements which provide displacement data.

Figure 1:
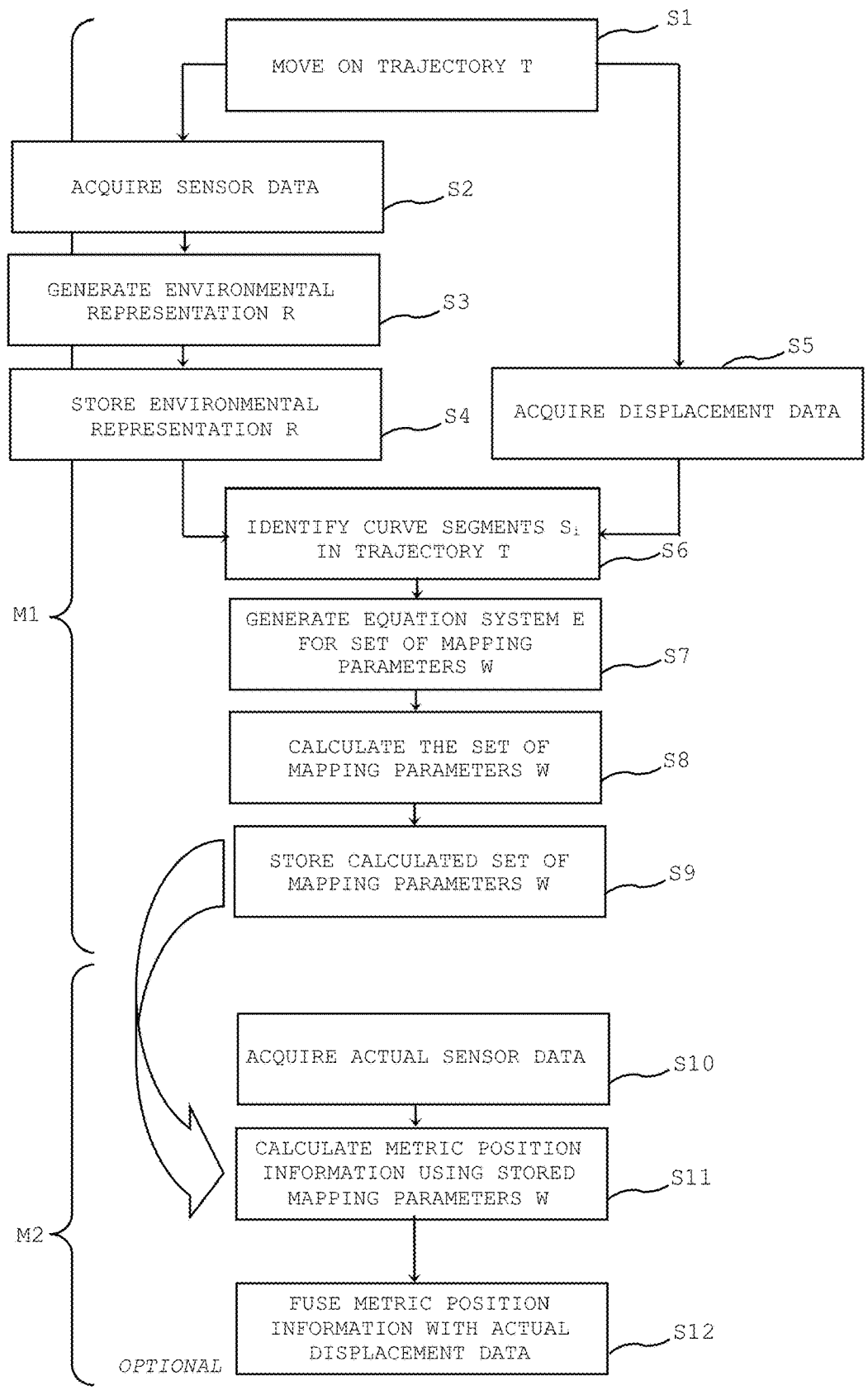
Figure 2:
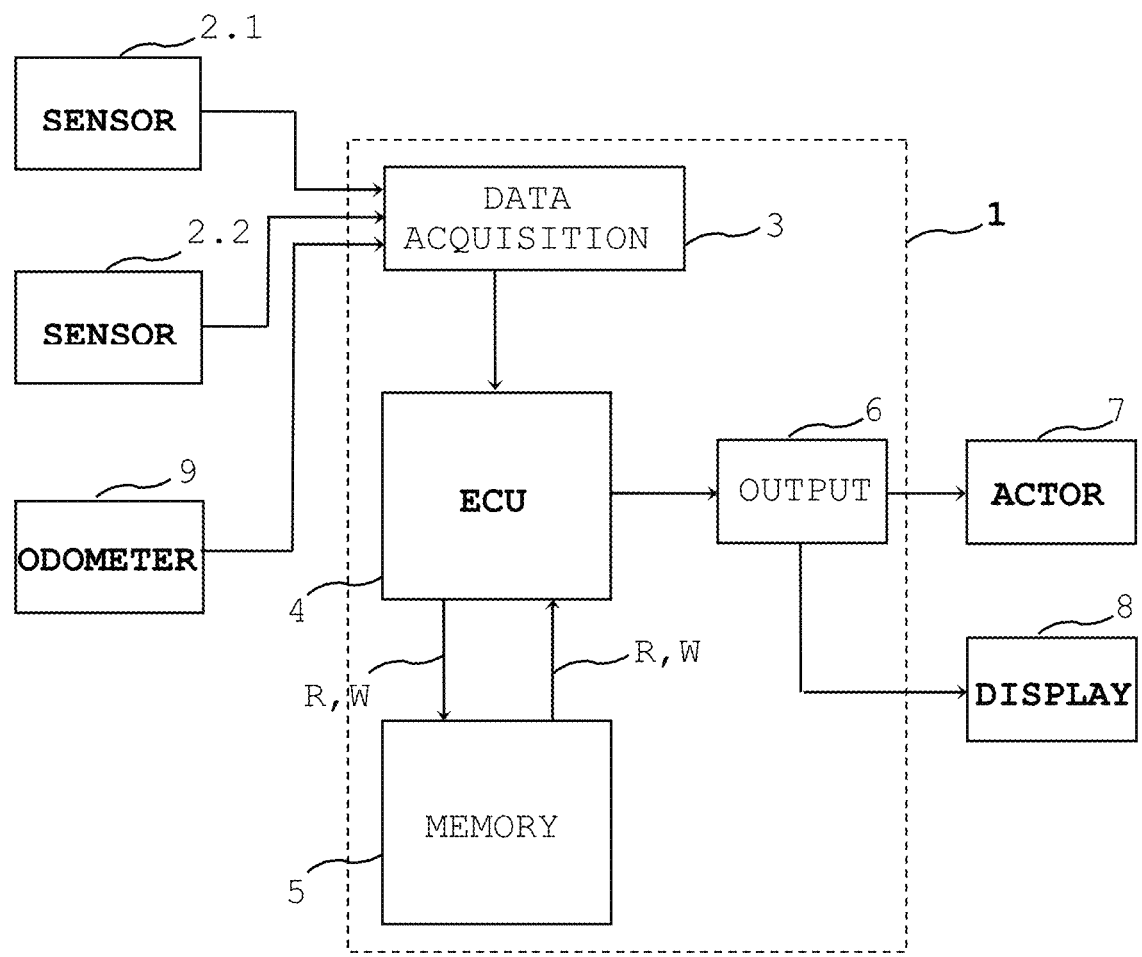

In FIG. 1 a flowchart of a self-localization method for a mobile device according to an embodiment is shown. For the structural units and modules of the localization system reference to FIG. 2 and reference numbers in FIG. 2 is made.

Generally a navigation method for a mobile device comprises two distinct phases: In a (first) learning (training) phase M1 environmental representations R are learned. In a (second) application phase M2, a navigation task is performed based on the learned environmental representations R.

A navigation task can include navigating the mobile device from a starting point to a target point in a working area (working environment).

The individual method steps can be implemented in software modules running in an electronic control unit 4 of the localization system 1. The electronic control unit 4 may be a processor, a plurality of processors or signal processors arranged on a common board or in a distributed manner in the mobile device. Part or all of the software may be running locally in the mobile device and/or externally to the mobile device on remote computer or server.

In a first step S1, the mobile device enters a learning phase M1 and starts to move on a predefined trajectory T in the working area.

The learning phase M1 continues with a step S2 of a data acquisition unit 3 (data acquisition interface) acquiring sensor data from at least one sensor 2.1, 2.2 on the environment of the mobile vehicle. The mobile vehicle can be assigned a working space or working area in which the mobile vehicle is currently located at a current location (current position). The information contained in the acquired sensor data describes how the sensor 2.1, 2.2 of the vehicle perceives the perceivable environment from the current location of the mobile device.

Acquired sensor data typically varies strongly while the mobile device travels along a trajectory. Furthermore sensory representations in sensor data of adjacent positions are often more different than sensory representations of widely separated places. Even rotating the mobile device on a spot can change the sensory representation completely. Taking a difference between the current position's sensory representation and a target positions representation will thus typically vary wildly and includes little or no information where to go next for arriving at the target position.

The sensor type or sensor combination may include camera(s), sonar, radar laser scanner, global navigation satellite systems (GNSS), radio frequency identification (RFID) detection and ranging, camera sensors with a 360 degree field of view, for example fisheye camera or catadioptric camera, enable a simulated rotation of the mobile device and its sensors 2.1, 2.2. A catadioptric sensor is a visual sensor that contains mirrors (catoptrics) and lenses (dioptrics) as a combined catadioptric system. The catadioptric sensor is a panoramic sensor created by pointing a camera at a curved mirror. Generally, for a good sensor performance due to advantageous sensor data, the sensors 2.1, 2.2 or sensor arrangement should yield unique representations of any place in the environment during the learning phase M1.

In step S3, the acquired sensor data is used to generate an environmental representation R based on the acquired sensor data. In particular, in step S3 an environmental representation by performing unsupervised learning from the acquired sensor data is performed. In a particularly preferred embodiment, a slow feature analysis (SFA) is performed to generate the environmental representation R.

In slowness learning as executed by SFA, the resulting environmental representation mainly depends on the movement statistics of the mobile device during the learning phase M1. Position encoding with invariance to a direction of a sensor 2.1, 2.2, in particular a camera sensor, requires a rather large amount of sensor rotation around the yaw-axis of the sensor 2.1, 2.2 when compared to translational movement of the sensor 2.1, 2.2 during mapping of the environment of the mobile device. For a sensor 2.1, 2.2 mounted in a fixed manner to the mobile device and with an invariable sensor coverage area, the sensor movement corresponds to a movement of the mobile device.

The environmental representation R generated in step S3 is stored in a data storage unit 5 (memory) in step S4. The mobile device may comprise a navigation system with an on board data storage unit 5 (memory) storing the learned environmental representation. Additionally or alternatively, the navigation system has access, for example via a communication unit not shown in FIG. 2 to a data server located externally to the mobile device and storing the environmental representation, or a plurality of environmental representations for example for plural working areas.

The environmental representation R generated in step S3 forms the basis for the application phase M2 for performing a navigation task.

Certain unsupervised learning algorithms based on slowness learning generate spatial representations or maps that vary smoothly in space. The invention benefits from such smooth representations, which are learned by unsupervised learning for a specific environment in the learning phase M1, for example by the mobile device driving around randomly.

Training trajectories in the training phase M1 are particularly advantageous, when orientation invariance is achieved with a relatively high amount of turning compared to movement forward of the mobile device during the learning phase M1, or by simulating such rotations by additionally rotating the sensor or simulating additional rotation by rotating the sensory representation during the learning phase M1.

Preferably a sufficiently long intermeshed and homogenous coverage of the training area is provided during the learning phase M1.

If the average movement velocity per region of the training area is non-homogenous, for example caused by velocity differences when travelling on a road surface versus travelling through mud, the travel velocity of the mobile device will be encoded in the resulting environmental representations from the training phase M1.

For a large class of suitable training trajectories, after the learning phase M1, a subset of the learned representations are invariant with respect to orientation and change monotonically over space. These properties allow to navigate a mobile device between points by gradient descent on the difference of environmental representations between a spatial representation corresponding to a current location of the mobile device and a target spatial representation corresponding to a target location of the navigation task at hand.

In a step S5 the odometer system 9 generates (acquires) displacement data during the mobile device moving along the trajectory T. The displacement data is provided via the data acquisition interface 3 to the electronic control unit 4 (ECU) of the localization system 1. The electronic control unit 4 stores the acquired displacement data and the environmental representation R in a memory 5 and may access the displacement data and the environmental representation R during execution of the method. The stored displacement data and the environmental representation R are correlated by their respective time when the data was acquired by the mobile device when travelling along the trajectory T.

Step S3 during the learning phase M1 of generating an environmental representation is discussed with reference to FIGS. 3(a)-3(c) in more detail.

The electronic control unit 4 can, without being limited to the discussed approach, apply a slow feature analysis (SFA) approach to transform the acquired sensor data, in particular multidimensional sensor data to slowly varying output signals encoding spatial properties of the environment into a slowly varying environmental representation R.

The SFA approach aims at finding instantaneous scalar input-output functions $g_j(x)$, such that output signals $s_j(t)$ $$s_j(t) := g_j(x(t)); \quad (1)$$

minimize $$\Delta(s_j) := \langle \dot{s}_j^2 \rangle_t; \quad (2)$$

under constraints of $$\langle s_j \rangle_t = 0; \quad (3)$$

which means that a mean value of the output signals $y_j(t)$ is zero, and $$\langle \dot{s}_j^2 \rangle 1; \quad (4)$$

which means, that the output signals $s_j(t)$ have a unit variance, and further, that $$\forall i < j : \langle s_i s_j \rangle_t = 0; \quad (5)$$

which requires that output functions $s_j(t)$ are de-correlated from one other and guarantees that different output signal components code different information.

In equations (3), (4) and (5), the term $\langle\ \rangle$ denotes an averaging over time ands is the first derivative of s with respect to time. The $\Delta$-value in (2) is the optimization objective and measures a slowness of an output signal as the time average of its squared derivative. A low $\Delta$-value indicates small variations over time and accordingly slowly varying signals. Equations (3) and (4) normalize all output signals to a common scale. Their temporal derivative is therefore directly comparable. The formulation of (3) and (4) suppresses the trivial constant solution to the optimization problem, which carries no information, despite being infinitely slow. Although aiming at maximizing slowness over time, the functions $g_j$ must extract the output signals instantaneously. Solutions which produce slow-varying output signals by smoothing input sensor signals over time, for example by computing a moving average of $x_i(t)$, or by low pass-filtering the signals are thus excluded. The SFA offers instantaneous processing and simultaneously a slow moving output carrying the information, in particular that different functions $g_j$ encode different aspects of the input sensor signals acquired by the sensors 2.1, 2.2 on the environment of the mobile device.

The SFA analysis may include finding a solution based on solving an eigenvalue problem.

For addressing the task of self-localization functions that encode the mobile devices current location as slowly varying features and that are simultaneously invariant with respect to the mobile devices actual orientation are suited. The information encoded in the learned slow features depends on the statistics of the training data, in particular the sensor data acquired during the training phase M1. In order to achieve orientation invariance, the orientation of the mobile device has to be changed on a faster timescale than the position of the mobile device during the training Phase M1.

The mobile device can, for example, use an omnidirectional mirror suitably arranged with respect to the sensor 2.1, 2.2 implemented as a camera in order to realize additional mobile device rotation and shift a sliding window over the periodic panoramic window for pre-processing the acquired sensor data.

The navigation method acquires in step S2 sensor data, in particular visual sensor data, which can be processed in step S3 by a hierarchical network made of several converging layers. The layers can be trained subsequently with all training visual sensor data images in temporal order of their recording during the training phase M1. A single node per layer is trained with stimuli from all node locations in its layer and replicated throughout the layer after training. Once the training phase is finished, slow features are computed instantaneously from a single image.

In step S6, the trajectory is segmented into plural segments $S_i$, each segment having a curve type with an advantageously simple mathematical description. In the discussed embodiment, only segments $S_i$ of a straight line type are used, however, the invention is not limited to this particular curve type and the skilled person is readily able to apply the teaching herein given also to other curve types.

Segmentation of the trajectory T can be performed using and based on the displacement data, for example by identifying sharp turns in the trajectory T on which the mobile device is travelling.

In a next step S7, an equation system E is generated for a set of mapping parameters W. The equation system E includes as known values the environmental representations R at each point on the curve segments $S_i$ and distances from the displacement data between each point. Unknown parameters in the generated equation system E are for example a slope angle of the straight line curve segments for the special case of segments of a line shape as curve type. Further unknown parameters are the mapping parameters of the set of mapping parameters W, in particular weights and biases for a regression.

The inventive method according to the embodiment discussed in detail uses the environmental representation R calculated by SFA from sensor data acquired by the sensor 2.1, 2.2, for example image data acquired by a camera sensor.

Generally, given the slow feature vector $s \in R^J$ computed for the image from a given position $p:=(x,y)^T$, a set of mapping parameters W (weight matrix) $W=(w_x\ w_y) \in R^{J*2}$ such that the error $\varepsilon \in R^2$ for the estimation $p = W^T + \varepsilon$ is minimal is to be determined.

The term weight matrix W refers to the set of mapping parameters in the context of the present invention.

Without external measurements of the mobile device's position p, the only source of metric information available is from ego-motion estimates of the mobile device. As already stated, pose estimation exclusively based on displacement data from the odometer system 9 accumulates errors over time and thus does not provide suitable label information to learn the weight matrix W directly. Especially errors in an orientation measurement cause large deviations in the displacement data. On the other hand a distance measurement in the displacement data from the odometer system 9 is locally very precise. In order to learn the weight matrix W using these distance measurements, data acquired while the mobile device is traveling along the trajectory T with a certain trajectory type is used.

For the explanation given herein it is assumed that the mobile device moves along straight lines as individual segments $S_i$ such that the training area is evenly covered and there exists a certain number of intersections between the lines 1. This represents a minimal constraint since such movement strategy is typical for current household robots or robotic lawn mowers and similar mobile devices.

A line l consists of M points $P=(p_1, \ldots, p_M)$. At every point $p_m$ a slow feature vector $s_m$ computed for the corresponding image and a current distance measurement $d_m$ to the origin o of line l, wherein $d_m = \|p_m - o\|_2$, and offset vector $o:=(x_0;y_0)^T$ are recorded. Based on the orientation $\alpha_l$ of the line l, the origin o and the distance measurement $d_m$, the reconstruction of a point is given by the equation $p_m = o + d_m (\cos(\alpha)\ \sin(\alpha))^T$. For the correct weight matrix W the reconstruction of the same point using slow feature vector $s_m$ is defined by $p_m = W^T s_m$.

However, the line parameters o and a as well as the weight matrix W are unknown and need to be estimated. Given optimal parameters the difference between the point-wise estimations based on the line parameters and the weight matrix are minimal. Thus, the parameters can be learned simultaneously by minimizing the difference in the point-wise reconstruction. The distance measurements from the odometer system 9 introduce the correct metric scale while the intersections of the line segments and the weights of the weight matrix W ensure a globally consistent mapping. For N line segments as segments S a cost function C for parameters $\theta=(\alpha_1, a_n; o_1, \ldots, o_n, W)$ is as follows:

$$C(\theta) = \frac{1}{2}\sum_{n=1}^{N}\sum_{m=1}^{M_n}\|o_n + d_{n,m}(\cos(\alpha_n)\ \sin(\alpha_n))^T - W^T s_{n,m}\|_2^2 \quad (6)$$

In equation (6), $M_n$ is the number of points on line $l_n$. The corresponding partial derivatives with respect to the parameters θ are given by (7):

$$\frac{\partial C}{\partial \alpha_n} = \sum_{m=1}^{M} d_{n,m}(\sin(\alpha_n) - \cos(\alpha_n))\ (W^T s_{n,m} - o_n) \quad (7)$$

$$\frac{\partial C}{\partial o_n} = \sum_{m=1}^{M} o_n + d_{n,m}(\cos(\alpha_n)\ \sin(\alpha_n))^T W^T s_{n,m}$$

$$\frac{\partial C}{\partial W} = \sum_{n=1}^{N}\sum_{m=1}^{M} -s_{n,m}(o_n + d_{n,m}(\cos(\alpha_n)\ \sin(\alpha_n))^T W^T s_{n,m})^T$$

If the mobile device explores the working environment efficiently, driving along straight lines 1 in a grid like trajectory T with a few crossings along each coordinate axis will result in angles between line segments to be nearly 90°. Hence, the learned linear mapping of slow feature vectors to metric positions defined by the weight matrix W with the set of mapping parameters might contain a shearing of the coordinate axis.

In one case, the learned solution maps all points onto a single line. To avoid this problem, the orientation $\alpha_n$ of a line can be constrained such that the relative angle between consecutive line segments corresponds to the measured change in orientation from the displacement data. Therefore, a term can be added to the cost function C that punishes the deviation of the relative angle defined by the current estimate of $\alpha_n$ and $\alpha_{n+1}$ from the measured change in orientation $\measuredangle l_n l_{n+1}$ obtained from odometry.

$\alpha_n$ and $\alpha_{n+1}$ are expressed as unit vectors to obtain the cosine of the relative angle given by their dot product. The deviation of the relative angle from the measured angle is then defined as the difference between the angles' cosine values. The cost function C from equation (6) is thus extended:

$$C'(\theta) = \frac{1}{2}\sum_{n=1}^{N}\sum_{m=1}^{M_n}\|o_n + d_{n,m}(\cos(\alpha_n)\ \sin(\alpha_n))^T - W^T s_{n,m}\|_2^2 + \quad (8)$$

$$\frac{1}{2}\sum_{n=1}^{N-1}(\cos(\alpha_n)\ \cos(\alpha_{n+1}) + \sin(\alpha_n)\ \sin(\alpha_{n+1}) - \cos(\measuredangle l_n l_{n+1}))^2$$

Thus, while the cost function C in equation (6) only uses translation measurements, C' additionally uses yaw rotation information acquired in the displacement data from the odometer system 9. The partial derivatives of cost function in equation (8) are equal to those of the cost function in equation (7) except for the partial derivative of $\alpha_n$. The partial derivative of $\alpha_n$ is given by the following equation:

$$\frac{\partial C}{\partial \alpha_n} = \sum_{m=1}^{M} d_{n,m}(\sin(\alpha_n) - \cos(\alpha_n))\ (W^T s_{n,m} - o_n) + \quad (9)$$

$\sin(\alpha_n - \alpha_{n+1})\ (\cos(\measuredangle l_n l_{n+1}) - \cos(\alpha_n - \alpha_{n+1}))$, if $n = 1$, or $\sin(\alpha_n - \alpha_{n+1})\ (\cos(\measuredangle l_n l_{n+1}) - \cos(\alpha_n - \alpha_{n+1})) +$ $\sin(\alpha_{n-1} - \alpha_n)\ (\cos(\alpha_{n-1} - \alpha_n) - \cos(\measuredangle l_{n-1} l_n))$, otherwise;

A solution for the parameters θ can be obtained performing gradient descent on the cost function C. The update in an iteration step t is given by:

$$v_t = \gamma v_{t-1} + \beta \frac{\partial C}{\partial \theta} \quad (10)$$

$$\theta_t = \theta_{t-1} - v_t$$

In equation (10), β is a learning rate and $\gamma \in (0,1]$ is a momentum term to increase speed of convergence and regulate the amount of information from previous gradients which is incorporated into the current update. The parameter γ is from an interval excluding zero.

The calculated solutions may be translated and rotated with respect to a coordinate system of the odometer system 9 and inherent to the displacement data. The calculated solutions may also be mirrored for the cost function C. If required, this may be corrected by constraining, for example, $o_0$ and $\alpha_1$ to be compatible with a chosen coordinate system or by rotating, shifting and mirroring the solution in a post-processing step.

It is to be noted that the set of mapping parameters W comprises parameters θ which all are subject to optimization, consisting of mapping parameters $\theta_{xy}$ for the 2D plane and curve parameters $\theta_i$.

The mapping parameters $\theta_{xy}$ are kept and stored after the optimization, as they define the mapping function $M_{\theta\_xy}$: R(t)→P(t) from the environmental representation R to the metric position information P. In a linear case for example, $M_{\theta xy}$ consists of two regression weight vectors. $\theta_i$ contains all parameters to describe the metric location of points $P_i$ along a curve segment $S_i$. For the simple case of a curve type describing straight line segments in 2D, $\theta_i$ consists of two values for an offset $(x_0, y_0)$ and one value for the line slope α, for example.

The method may formulate a cost function C, which is minimized by gradient descent in order to find a mapping from the environmental representation R to a metric position information, using the analytically found partial derivatives of the parameters.

Alternatively, the cost function C can be minimized by other state of the art optimizers, for example the Nelder-Mead Simplex algorithm or the Newton-Conjugate-Gradient algorithm, genetic optimization, or Sequential Least Squares Programming. Some optimizers may be faster converging, or better support constrained optimization, for example forcing the coordinate system orientation and mirror-symmetry.

A further alternative is to construct an equation system of relations between the parameters instead of the cost function C and then using an approximate equation solver.

In FIG. 1, in step S8, the set of mapping parameters W is calculated from the equation system as generated in step S7 by means of an optimization method. The set of mapping parameters W enables to calculate the metric position information from an environmental representation R.

In a subsequent step S9, the calculated set of mapping parameters W is stored in the memory 5. Thus, in a subsequent operation phase M2, the electronic control unit 4 can access the memory 5 and use the set of mapping parameters W to calculate the metric position information using the set of mapping parameters W.

In step S10, the first step of the operation phase M2, the electronic control unit 4 obtains actual sensor data via the data acquisition interface 3 from the sensors 2.1, 2.2 while the mobile device is moving in its assigned working environment.

The environmental representation R is without loss of generality a SFA space as generated in a previous training phase M1. The application phase M2 may use a gradient based evaluation of the SFA space for navigation. Initially a number of slow feature components is selected. The slow features may be weighted, for example by multiplying them with the inverse of their β-value, for example a measure for their temporal variation.

In a subsequent step S11, the electronic control unit 4 uses the set of mapping parameters in order to calculate the metric position information from the actual sensor data via the environmental representation R. In the operation phase M2, the mobile device's metric position is calculated from environmental representations R with mapping parameters W.

As a result, the mobile device has an environmental representation calculated from the actual environmental representation transformed into metric position information available. No constraints on a trajectory driven by the mobile device apply in the operational phase M2. The metric position information can be used, for example, for navigation, for homing or for work area coverage control.

In a subsequent, optional step S12, the metric position information may be fused with actual displacement data, for example using an Extended Kalman Filter (EKF), in order to obtain metric position information combining the advantages of the displacement data acquired by the odometer system and the environmental representation acquired from the sensor data, in particular camera sensor data, and obtained by unsupervised learning.

FIG. 2 depicts a general block diagram of main elements of the self-localization system 1 of an embodiment mounted in a mobile device.

The main structural units of the self-localization system 1 for determining a metric position information are discussed with respect to the method steps of FIG. 1. This applies in particular to the sensors 2.1, 2.2, the odometer system 9, the data acquisition interface 3, the data storage unit (memory 5) and the electronic control unit 4 (ECU).

Generally, the invention is in the field of mobile devices and in assistance in operating mobile systems or autonomously operating mobile systems. The mobile device can be a vehicle, in particular a car or a motorcycle. The mobile device can also be a watercraft (vessel), an air vehicle or a space vehicle. The vehicle may be controlled by a user (person) on board of the vehicle or may be remotely controlled from a remote control position (facility), or preferably operating autonomously. The vehicle may be partially or fully autonomously operating as a robot. Respectively, the user (operator) of the vehicle and the assistance method can be a driver (vehicle driver), a rider in case of a motorcycle or a pilot of the vehicle. The user can also be a co-driver, co-pilot or navigator, which typically performs one or more subtasks of operating the vehicle and assists a pilot or driver. Furthermore, in case of a remotely controlled vehicle, the user may be an operator of a remotely piloted vehicle who performs vehicle control from a position detached from the vehicle.

FIG. 2 further shows an output unit 6 (output interface) of the self-localization system 1. The output unit 6 outputs processed position information, for example denoting a determined movement direction for navigating the mobile device. The movement direction may be output to an actor 7 of the mobile device. The actor 7 may be a directional drive control of the mobile device and controls a vehicle steering angle and a vehicle movement velocity based on the determined movement direction.

Additionally or alternatively, the output unit 6 outputs a signal based on or including the position information to a display 8. For example the display 8 is a display of a computer, a handheld computer or a smartphone running a navigation method as an application program and a determined movement direction based on the calculated position information is displayed as a recommendation to a user for moving towards a target location. The display 8 may be a display mounted in a vehicle. The estimated metric position information and the determined movement direction is displayed on the display 8 as a recommendation to a driver for driving to the target location.

Figure 3A:
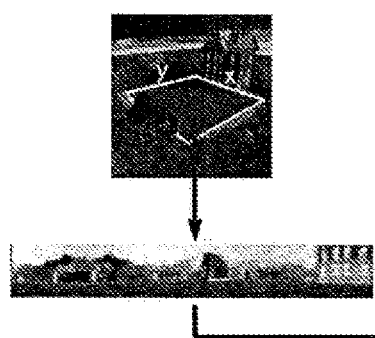
Figure 3B:
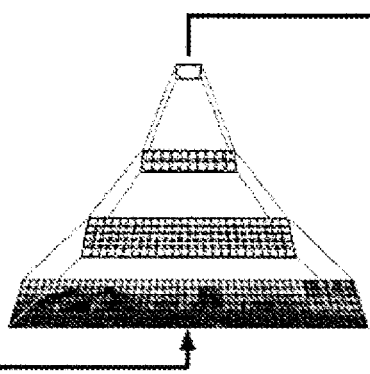
Figure 3C:
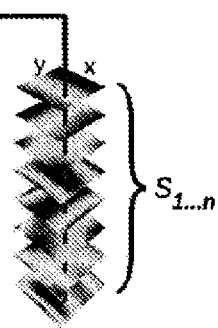

FIGS. 3(a)-3(c) provide a schematic model architecture for an SFA based analysis of an environment of a mobile device. The learned slow feature representation encodes other spatial attributes of the environment, for example obstacles and different terrain properties, which are reflected in the calculated gradients and leads to an efficient navigation for a mobile device in the environment.

FIGS. 3(a)-3(c) provide a general model architecture in its mid portion. FIGS. 3(a)-(c) and the general steps for generating the environmental representation may be found in more detail in "Outdoor self-localisation of a mobile robot using slow-feature analysis" by B. Metka, M. Franzius and U. Bauer-Wersing, in Neural Information processing, $20^{th}$ International conference ICONIP 2013, Daegu, Korea, Nov. 3-7, 2013, Proceedings, Part I, 2013, pp 403-408, which is incorporated by reference for some details of the learning phase M1 of the navigation method.

FIG. 3(a) shows the visual data which is steadily captured from a current position of the mobile device carrying a camera sensor 2.1, 2.2 and transformed into a panoramic view as sensor data.

FIG. 3(b) shows processing of the panoramic view in step S3 by the network. Each layer of the network comprises overlapping SFA-nodes arranged in a regular grid. Each node performs linear SFA for dimensionality reduction followed by quadratic SFA for slow feature extraction. The output layer is a signal node, whose eight slowest outputs $y_i$ (t) are the orientation invariant encoding of the location.

FIG. 3(c) depicts the coded SFA-outputs $S_{1 \ldots 8}$ over all positions, so-called spatial firing maps, which ideally show characteristic gradients along the coordinate axes and looking identical independent of the specific orientation.

The learned spatial representations are analyzed qualitatively by plotting the color coded slowest outputs over all positions. In case of a strong spatial coding, a clear gradient along the coordinate axis becomes visible in the spatial firing maps of the first two units. Maps of higher units show a mixture of the first two units or higher modes.

Due to the slowness objective of the SFA learning algorithm, obstacles situated in the working area of the mobile device are advantageously encoded in the resulting environmental representations. As during the learning phase M1, the mobile device, for example a wheeled robot, will not drive along a path crossing the obstacle, sensor data referenced to positions on both sides of the obstacle are separated in time. Slow feature based environmental representations will accordingly flow around the obstacle.

Figure 4:
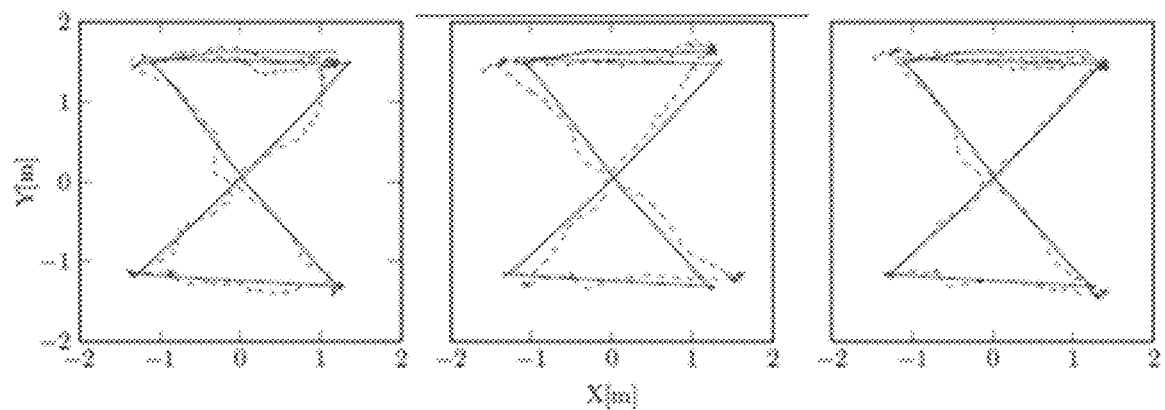
FIG. 4 shows an exemplary comparison for supervised and unsupervised regression for robot test data.

FIG. 4 depicts a comparison for supervised and unsupervised regression for robot test data as an example.

Generally, experiments were performed using unsupervised metric learning assuming that the slow feature representation of the environment has been learned in advance. The optimal parameters are obtained by minimizing the cost functions given in equations (6) and (8) using the distances and slow feature vectors sampled along the line segments.

The optimization terminates if either the number of maximum iterations is reached or the change in the value of the cost function falls below a threshold.

In order to assess the quality of the learned metric mapping the localization accuracy was measured on a separate test set as the mean Euclidean deviation from the ground truth coordinates. As a reference, the results of training a regression model directly on the ground truth coordinates are computed as well. Since there is no point of reference between both coordinate systems the estimated coordinates might be rotated and translated. Therefore, the ground truth and estimated metric coordinates have to be aligned before calculating an accuracy.

Any suitable known method may be employed to obtain the rigid transformation which rotates and translates the estimated coordinates to align them with the ground truth coordinates. The obtained transformation was then again applied to the estimations from the separate test set.

The eight slowest features were used for regression. A nonlinear expansion of the slow features to all monomials of degree 2 yields a 45-dimensional representation, which slightly increases localization accuracy.

Thus, the number of unknown parameters per line is $1+2+2\times45=93$ (scalar $\alpha$, 2D line offset and regression weights in two dimensions).

For the simulator experiment, the approach was first validated in a simulated garden-like environment.

The spatial representation was learned by training the SFA model with 1773 panoramic RGB-images with a resolution of 600_60 pixels from a trajectory that covers an area of 16×18 meters. Training data for the unsupervised metric learning was gathered by driving along 10 straight line segments with a random orientation and sampling the slow feature vector $s_{n,m}$, the distance measurement $d_{n,m}$ and the corresponding ground truth coordinates (x,y) in 0.2 m steps. In total 862 points were collected. Start and end points of the line segment were restricted to be within the training area and to have a minimum distance of 8 m. The parameters for the optimization were initialized with values from a random uniform distribution such that $\alpha\in[0;2\pi)$, $x_0\in[-8;8]$, $y_0\in[-9;9]$ and $w_{xk}, w_{yk}\in[-1;1]$. The learning rate was set to $\beta=1\times10^{-5}$ and the momentum term to g=0:95. The partial derivatives of the cost function are computed according to equations (7).

The simulator experiment yielded the optimization to terminate at about 1000 iterations where the change in the value of the cost function C fell below a predefined threshold.

For the line segments from the training data a mean Euclidean deviation from ground truth to the estimated coordinates from the supervised regression model amounts to 0.13 m. Applying the learned weight vectors from the unsupervised metric learning to the slow feature vectors results in an error of 0.17 m on the training set.

Using the set of mapping parameters W (weights) learned with the supervised regression model to predict coordinates on the separate test trajectory results in a mean Euclidean deviation of 0.39 m from the ground truth coordinates.

With the unsupervised model the predictions are closer to the ground truth coordinates with a mean deviation of 0.36 m. Predicted trajectories from both models closely follow the ground truth coordinates with noticeable deviations in the south-eastern and north-western part of the working environment. Considering the line segments from the training data it is apparent that those regions are only sparsely sampled while the density is much higher in the middle-eastern part. The lower accuracy of the supervised regression model might thus be due to slightly overfitting to the training data.

Omnidirectional image data was recorded with a camera mounted on an autonomous lawn mower together with the wheel odometer measurements and the yaw angle estimated by a gyroscope from the odometer system 9 of the mobile device. To obtain the training data for the unsupervised metric learning, a model architecture was used and trained while driving along straight lines as segments of the trajectory T, turning on the spot and driving along the next straight line. Thus, the points on the trajectory T can easily be segmented into line segments based on the translational and angular velocity measurements included in the displacement data from the odometer system 9. There were 18 line segments consisting of a total of 1346 points. In order to speed up the process and support convergence to an optimal solution, the line parameters $\alpha$, $x_0$, and $y_0$ have been initialized with the corresponding odometry measurements of the displacement data. The weight vectors $w_x$ and $w_y$ were initialized with the weights of regression models fitted to the raw odometry estimations in the displacement data. The learning rate is set to $\beta=1\times10^{-5}$ and the momentum term to $\gamma=0.95$. Due to the grid like trajectory with intersection angles all being around 90°, the cost function from equation (8) was used for the optimization.

The optimization ran for about 900 iterations until it converged to a stable solution. A prediction accuracy of the unsupervised model on the training data amounts to 0.17 m after estimations have been aligned to the ground truth coordinates.

A supervised model which was trained directly with the ground truth coordinates achieved an accuracy of 0.12 m.

Estimations from both models for the test data are equal to a mean Euclidean deviation of 0.14 m. The resulting predicted trajectories along with the ground truth trajectories are shown in FIG. 4, in which the left portion presents the result of the supervised regression, the center portion of FIG. 4 depicts the unsupervised regression, which is further aligned and shown in FIG. 4, right hand portion, in its aligned form.

For determining the fusion of SFA estimates and displacement data from odometry in a probabilistic filter it is assumed that the mobile device respective its electronic control unit 4 has access to relative motion measurements from the odometer system 9 as displacement data and absolute measurements from the SFA-model as environmental representation R in order to localize itself.

Even though the odometry measurements are locally very precise small errors accumulate over time and the belief of the own position starts to diverge from the true ground position.

The estimations from the SFA-model on the other hand have a higher variability but are absolute measurements and thus allow to correct for occurring drift. An inventive set of mapping parameters W as a mapping function from slow feature to metric space enables the combination of both measurements in a common coordinate system. To achieve the highest possible accuracy the combination needs to be optimal considering the uncertainties of both measurements.

A Kalman Filter is an optimal estimator that combines the information of different uncertain sources to obtain the values of interest together with their uncertainties for linear systems. A state transition model is used to predict the value for the next time step and a measurement model is used to correct the value based on observations. The state of the system is represented as a Gaussian distribution. However, for the present scenario of mobile device localization the state transition model involves trigonometric functions which lead to a nonlinear system.

The extended Kalman Filter (EKF) linearizes the state transition and measurement model around the current estimate to ensure the distributions remain Gaussian. Then, the equations of the linear Kalman filter can be applied. This method is generally known as the standard method for the problem of vehicle state estimation. For example, a Constant Turn Rate Velocity (CTRV) model can be used as the state transition model for the mobile device. The measurement model incorporates the absolute estimations resulting from the mapping of the current slow feature outputs to metric coordinates.

To test the localization performance with the EKF the test data from a robot experiment was used. Absolute coordinate predictions from slow feature outputs were computed using the unsupervised learned regression weights from the corresponding training data. They are used as input for the measurement model.

The displacement data (odometry readings) are used as input for the state transition model of the EKF. The values for the process and measurement noise covariance matrices were chosen based on a grid search. For the experiment, the mobile device starts from a known location and with a known orientation (heading). This represents a valid assumption considering that many mobile devices such as service robots begin operating from a base station.

The estimated trajectory of the EKF shows an improvement over the individual estimations since it combines their advantages of global consistency and local smoothness. The accuracy of the predicted trajectory from the SFA-model is 0.14 m with noticeable jitter. This can be clearly seen in the left portion of FIG. 4. Due to the absolute coordinate predictions the progression of the trajectory in the left portion of FIG. 4 is erratic in at least some portions.

The center portion of FIG. 4 shows that a trajectory resulting from the displacement data (odometry measurements) is locally smooth but especially the errors in the orientation estimation lead to a large divergence over time resulting in a mean Euclidean deviation of 0.31 m from the ground truth coordinates.

The accuracy of the trajectory estimated from the EKF amounts to 0.11 m which is an improvement of 21% on average compared to the accuracy obtained from the SFA model and an improvement of 65% compared to odometry.

By fusing the SFA estimates for the environmental representation including the position information and the displacement data from the odometer system 9, for example in the EKF, the advantageous characteristics of both approaches for addressing the localization problem become evident. The resulting accuracy may even reach a value of 0.11 m.

The inventive method for unsupervised learning of a mapping from SFA outputs to metric coordinates achieved accuracies in the same order of magnitude as a supervised regression model trained directly on ground truth coordinates. Since it only requires additional odometer measurements as displacement data and imposes reasonable constraints on the trajectory for training and determining the mapping parameters, it can be applied advantageously in real application scenarios where no external ground truth information is available.

The learned metric mapping function represented by the set of mapping parameters enables the visualization of the extracted environmental representations, the trajectories of the mobile device and the fusion of SFA environmental representations and odometry measurements using an EKF. Thereby, the already competitive localization accuracy of the SFA-model can be improved further by 21%.

The proposed approach may also be useful for other spatial representations than those learned by SFA, as long as they are sufficiently low-dimensional, spatially smooth, and preferably orientation invariant.

The precision of the resulting metric mapping, and hence also the localization accuracy, might be further improved using visual odometry instead of wheel odometry since visual odometry is not affected by wheel slippage.

The invention claimed is:

1. A method for determining a metric position information for a mobile device based on an environmental representation, the method comprising:
    generating sensor data by at least one sensor mounted on the mobile device;
    acquiring displacement data of the mobile device by an odometer system; and
    generating an environmental representation R based on the sensor data by applying an unsupervised learning algorithm,
    wherein the mobile device moves along a trajectory T, wherein the displacement data and the sensor data are acquired while the mobile device is moving along the trajectory T, and the trajectory T comprises plural curve segments $S_i$, the method further comprising
    calculating a set of mapping parameters W based on the environmental representation R and the displacement data, wherein the plural curve segments $S_i$ are parameterized by curve parameters in the step of calculating the set of mapping parameters W,
    determining a metric position estimation based on a further environmental representation and the calculated set of mapping parameters W, and
    segmenting the trajectory T into the curve segments $S_i$ with a set of curve parameters for each curve segment $S_i$,
    wherein in the step of calculating the set of mapping parameters, the set of mapping parameters W and the set of curve parameters are calculated by minimizing on all curve segments $S_i$ a difference measure between positions obtained by means of the displacement data on the one hand and corresponding positions obtained by means of a feature vector determined by unsupervised learning on the other hand.

2. The method for determining a metric position information according to claim 1, wherein
    the plural curve segments $S_i$ include at least one curve type of a straight line, a nearly straight line, a circle, a circle segment, a sigmoidal curve, a sine curve, a spline or a polynomial curve of a low order.

3. The method for determining a metric position information according to claim 1, wherein the odometer system acquires the displacement data from at least one of a wheel odometer, a visual odometer and an inertial measurement unit.

4. The method for determining a metric position information according to claim 1, wherein
the unsupervised learning algorithm uses a slowness learning algorithm, in particular a slow feature analysis.

5. The method for determining a metric position information according to claim 1, wherein
the step of calculating the set of mapping parameters is performed during a training phase M1 or during an initial operating phase or at scheduled intervals or continuously and incrementally.

6. The method for determining a metric position information according to claim 1, wherein
the step of calculating the set of mapping parameters W is repeated when an inconsistency between the metric position information and the displacement data is detected.

7. The method for determining a metric position information according to claim 1, wherein
the step of calculating the set of mapping parameters W is repeated when a residual exceeds a threshold in the step of calculating the set of mapping parameters.

8. The method for determining a metric position information according to claim 1, wherein
the set of mapping parameters W is calculated as affine regressions for the location of the mobile device, in particular as two affine regressions for a two-dimensional location of the mobile device on a planar surface.

9. The method for determining a metric position information according to claim 1, wherein
the set of mapping parameters W is calculated as nonlinear regressions, for example quadratic regressions, or by fitting with a neural network.

10. The method for determining a metric position information according to claim 1, wherein
the set of mapping parameters W are calculated by solving an optimization problem using a set of linear equations E, or by using a simplex algorithm, or by a gradient descent on the set of linear equations E.

11. The method for determining a metric position information according to claim 10, wherein
the set of mapping parameters W are calculated by gradient descent on the set of linear equations E, wherein derivatives of the set of linear equations E are computed before.

12. The method for determining a metric position information according to claim 1, wherein
parameters for calculating the set of mapping parameters W are initialized based on at least a part of the displacement data.

13. The method for determining a metric position information according to claim 1, further comprising
transforming, by at least one of rotating, minoring and shifting the calculated metric position estimation to a desired coordinate system.

14. The method for determining a metric position information according to claim 13, wherein
the set of mapping parameters W is calculated for the desired coordinate system which is centered in a base station of the mobile device.

15. The method for determining a metric position information according to claim 13, wherein
the set of mapping parameters W for the desired coordinate system centered in a base station of the mobile device are calculated by constraining an optimization to a reference map position as an initial trajectory point in the base station, or
correcting the set of mapping parameters W in a post-processing step including at least one of rotating, shifting and mirroring the mapping to match an initial portion of the displacement data corresponding to an initial portion of the trajectory T.

16. The method for determining a metric position information according to claim 1, wherein
the step of the mobile device moving along a trajectory T is part of a learning phase M1 for learning the environmental representation R from the sensor data, wherein a memory of the mobile device is configured to store the sensor data acquired during the learning phase M1, or
the step of the mobile device moving along a trajectory T is performed after the learning phase M1 has been performed.

17. The method for determining a metric position information according to claim 16, wherein
the step of calculating the set of mapping parameters W is performed during the learning phase M1 for learning the environmental representation R from the sensor data, wherein an online learning algorithm for learning the environmental representation R is used.

18. The method for determining a metric position information according to claim 1, wherein
the step of calculating the set of mapping parameters W is performed alternately with a learning step of learning the environmental representation R from the sensor data.

19. A computer program embodied on a non-transitory computer-readable medium, said medium being encoded with program-code which, when the program is executed on a computer or digital signal processor, controls the computer or digital signal processor to execute the method according to claim 1.

20. A system for determining a metric position information of a mobile device from an environmental representation, the mobile device comprising:
at least one sensor configured to acquire sensor data, and
an odometer system configured to obtain displacement data of the mobile device,
the system comprising an electronic control unit configured to generate an environmental representation R generated from the sensor data by applying an unsupervised learning algorithm,
wherein the electronic control unit is configured to calculate a set of mapping parameters W based on the environmental representation and the displacement data,
wherein the displacement data and the sensor data are acquired while the mobile device is traveling along a trajectory T, and the trajectory T comprises plural curve segments $S_i$ and the plural curve segments $S_i$ are parameterized by curve parameters when calculating the set of mapping parameters W,
wherein the system is further configured to calculate the metric position estimation based on the environmental representation R and the calculated set of mapping parameters W,
wherein the electronic control unit is configured to segment the trajectory T into the curve segments $S_i$ with a set of curve parameters for each curve segment $S_i$, and
wherein the electronic control unit is configured to calculate the set of mapping parameters W and the set of curve parameters by minimizing on all curve segments $S_i$ a difference measure between positions obtained by means of the displacement data on the one hand and corresponding positions obtained by means of a feature vector determined by unsupervised learning on the other hand.

21. The system for determining a metric position information according to claim 20, wherein
the mobile device comprises a mobile robot, a robotic lawn mower, a robotic cleaner, a moveable portion of a robot, or a smartphone.

22. A method for determining a metric position information for a mobile device based on an environmental representation, the method comprising:
generating sensor data by at least one sensor mounted on the mobile device,
acquiring displacement data of the mobile device by an odometer system, and
generating an environmental representation R based on the sensor data by applying a slowness learning algorithm,
wherein the mobile device moves along a trajectory T, wherein the displacement data and the sensor data are acquired while the mobile device is moving along the trajectory T, and the trajectory T comprises plural curve segments $S_i$, the method further comprising
calculating a set of mapping parameters W based on the environmental representation R and the displacement data, wherein the plural curve segments $S_i$ are parameterized by curve parameters in the step of calculating the set of mapping parameters W,
determining a metric position estimation based on a further environmental representation and the calculated set of mapping parameters W, and
segmenting the trajectory T into the curve segments $S_i$ with a set of curve parameters for each curve segment $S_i$,
wherein in the step of calculating the set of mapping parameters, the set of mapping parameters W and the set of curve parameters are calculated by minimizing on all curve segments $S_i$ a difference measure between positions obtained by means of the displacement data on the one hand and corresponding positions obtained by means of a slow feature vector on the other hand.

23. A system for determining a metric position information of a mobile device from an environmental representation, the mobile device comprising:
at least one sensor configured to acquire sensor data, and
an odometer system configured to obtain displacement data of the mobile device,
the system comprising an electronic control unit configured to generate an environmental representation R generated from the sensor data by applying a slowness learning algorithm,
wherein the electronic control unit is configured to calculate a set of mapping parameters W based on the environmental representation R and the displacement data,
wherein the displacement data and the sensor data are acquired while the mobile device is traveling along a trajectory T, and the trajectory T comprises plural curve segments $S_i$, and the plural curve segments $S_i$ are parameterized by curve parameters when calculating the set of mapping parameters W,
wherein the system is further configured to calculate the metric position estimation based on the environmental representation R and the calculated set of mapping parameters W,
wherein the electronic control unit is configured to segment the trajectory T into the curve segments $S_i$ with a set of curve parameters for each curve segment $S_i$, and
wherein the electronic control unit is configured to calculate the set of mapping parameters W and the set of curve parameters by minimizing on all curve segments $S_i$ a difference measure between positions obtained by means of the displacement data on the one hand and corresponding positions obtained by means of a slow feature vector on the other hand.

* * * * *